United States Patent
Hatano et al.

(10) Patent No.: US 6,791,935 B2
(45) Date of Patent: Sep. 14, 2004

(54) OPTICAL HEAD, AND OPTICAL RECORDING AND REPRODUCING APPARATUS

(75) Inventors: Hiroshi Hatano, Osaka (JP); Kazuyuki Ogura, Osaka (JP); Akira Sato, Osaka (JP); Yujiro Suzuki, Osaka (JP)

(73) Assignee: Minolta Co., Ltd., Osaka (JP)

( * ) Notice: Subject to any disclaimer, the term of this patent is extended or adjusted under 35 U.S.C. 154(b) by 337 days.

(21) Appl. No.: 09/770,203

(22) Filed: Jan. 29, 2001

(65) Prior Publication Data

US 2001/0017838 A1 Aug. 30, 2001

(30) Foreign Application Priority Data

Feb. 17, 2000 (JP) ........................................ 2000-039522

(51) Int. Cl.⁷ ........................... G11B 7/135; G11B 11/00
(52) U.S. Cl. ............................... 369/112.24; 369/13.33
(58) Field of Search ................. 369/112.24, 112.02, 369/44.15, 13.33, 112.23, 44.13, 44.23, 112.07; 359/618, 387, 728, 822, 819, 664, 356, 510, 823, 508, 646, 716; 355/67, 53; 362/268, 551, 553; 250/458.1; 219/121.69

(56) References Cited

U.S. PATENT DOCUMENTS

| | | | |
|---|---|---|---|
| 3,947,093 A | * 3/1976 | Goshima et al. | 359/716 |
| 4,626,079 A | * 12/1986 | Nakamura et al. | 359/387 |
| 4,712,885 A | * 12/1987 | Dawson et al. | 359/728 |
| 5,004,307 A | 4/1991 | Kino et al. | 359/356 |
| 5,125,750 A | 6/1992 | Corle et al. | 359/819 |
| 5,467,335 A | * 11/1995 | Braat | 369/112.23 |
| 5,475,197 A | * 12/1995 | Wrobel et al. | 219/121.69 |
| 5,701,286 A | * 12/1997 | Sato | 369/112.07 |
| 5,745,294 A | * 4/1998 | Kudo | 359/618 |
| 5,764,613 A | 6/1998 | Yamamoto et al. | 369/112.24 |
| 5,774,281 A | 6/1998 | Maeda et al. | 359/822 |
| 5,786,947 A | 7/1998 | Maeda et al. | 359/822 |
| 5,796,112 A | * 8/1998 | Ichie | 250/458.1 |
| 5,859,727 A | * 1/1999 | Tsuchiya | 359/387 |
| 5,946,282 A | 8/1999 | Hirono et al. | 369/112.02 |
| 6,137,632 A | * 10/2000 | Bernacki | 359/618 |
| 6,154,326 A | * 11/2000 | Ueyanagi et al. | 359/819 |
| 6,185,051 B1 | 2/2001 | Chen et al. | 359/709 |
| 6,236,449 B1 | * 5/2001 | Tanitsu | 355/67 |

FOREIGN PATENT DOCUMENTS

JP         7-192280        7/1995

* cited by examiner

*Primary Examiner*—William Korzuch
*Assistant Examiner*—Kim-Kwok Chu
(74) *Attorney, Agent, or Firm*—Morrison & Foerster LLP

(57) ABSTRACT

An optical head has a near-field light generating element generating near-field light; and a beam shaper which shapes an incident beam into a substantially toroidal beam and directs the shaped beam to said near-field light generating element. According to the optical head having the above-described structure, the incident light is shaped into a substantially toroidal beam without being intercepted, incident on the zonal part of the near-field light generating element, and condensed to a minute spot. That is, only the light of the high numerical aperture part is used with efficiency, and the light can be condensed to a minute spot.

12 Claims, 7 Drawing Sheets

OPTICAL HEAD, AND OPTICAL RECORDING AND REPRODUCING APPARATUS

RELATED APPLICATION

This application is based on application No. 2000-39522 filed in Japan, the content of which is hereby incorporated by reference.

1. Field of the Invention

The present invention relates to an optical head, particularly, an optical head for performing recording, reproduction and erasure by use of near-field light, and an optical recording and reproducing apparatus having the optical head.

2. Description of the Prior Art

In recent years, to realize high density recording by using light, a solid immersion technology has been proposed. This technology is to form a minute light spot of not more than 100 nm by reducing the wavelength of light by disposing a high refractive index material between an objective lens and a record medium. As the high refractive index material, although liquid (oil or water) is frequently used in the field of high resolution microscopes, in the field of optical recording, a solid immersion lens or a solid immersion mirror is used to form an optical head.

In such an optical head, a solid immersion lens or a solid immersion mirror is disposed at a distance shorter than the wavelength of light from the surface of the record medium so that the numerical aperture (NA) of light condensation is large, that is, the spot of light condensation is small, thereby realizing high density recording.

In this type of optical head, when some configurations of solid immersion mirrors are used, it is desirable to use only the zonal part of the incident beam without using the central part thereof. Moreover, there are cases where it is desirable to use only light of the high numerical aperture part in order that the spot of light condensation is small on the solid immersion lens or the solid immersion mirror. To obtain such incident light, it is considered to intercept the central part of the beam. However, this reduces the efficiency of use of light, which leads to reduction in the efficiency of recording and the like and reduction in speed.

SUMMARY OF THE INVENTION

An object of the present invention is to provide an improved optical head and optical recording and reproducing apparatus.

Another object of the present invention is to provide an optical head and an optical recording and reproducing apparatus in which the efficiency of use of light is increased to solve the problems of reduction in the efficiency of recording and the like and reduction in speed.

The above-mentioned objects are achieved by an optical head comprises a near-field light generating element which generates near-field light; and a beam splitter which splits an incident light into a plurality of beams and directs the split beams to said near-field light generating element.

According to the optical head having the above-described structure, the light emitted from the light source portion is split into a plurality of beams, incident on the zonal part of the near-field light generating element, and condensed inside the element. Consequently, the light emitted from the light source portion is effectively used without being intercepted, and the light can be condensed to a minute spot, that is, the numerical aperture can be increased.

Moreover, an optical head of another structure comprises a near-field light generating element which generates near-field light; and a beam shaper which shapes an incident beam into a substantially toroidal beam and directs the shaped beam to said near-field light generating element.

According to the optical head having the above-described structure, the light emitted from the light source portion is shaped into a substantially toroidal beam without being intercepted, incident on the zonal part of the near-field light generating element, and condensed to a minute spot. That is, only the light of the high numerical aperture part is used with efficiency, and the light can be condensed to a minute spot.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Hereinafter, an embodiment of the optical head and the optical recording and reproducing apparatus according to the present invention will be described with reference to the attached drawings.

Figure 1:
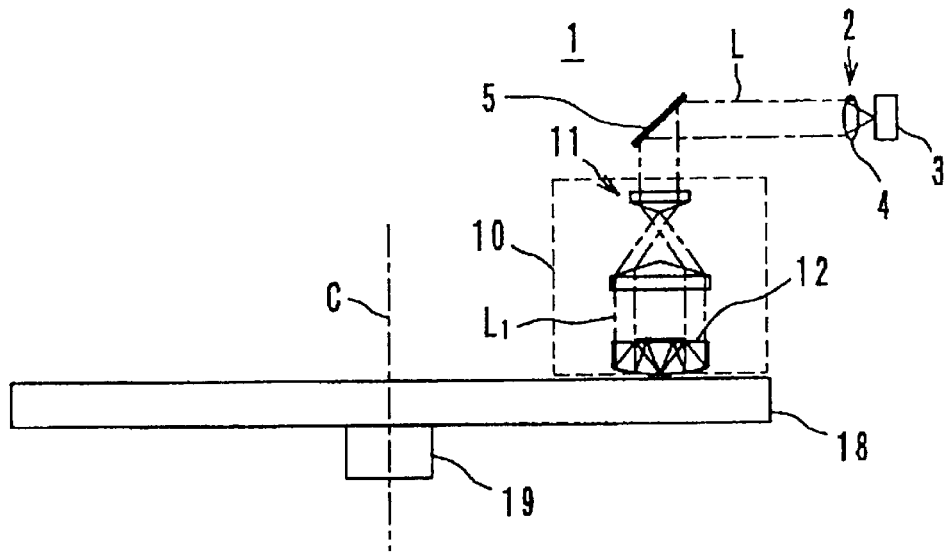
FIG. 1 schematically shows the structure of an optical recording and reproducing apparatus according to an embodiment of the present invention.

Optical Recording and Reproducing Apparatus, Referring FIG. 1

FIG. 1 shows an optical recording and reproducing apparatus 1 according to an embodiment of the present invention. The apparatus 1 mainly includes a light source portion 2, a plane mirror 5 and an optical head 10. The light source portion 2 is a known one comprising a laser diode 3 as a light source and a collimator lens 4. The optical head 10 comprises a beam shaper 11 and a solid immersion mirror 12.

The laser beam L emitted from the laser diode 3 is collimated by the collimator lens 4 and reflected at the mirror 5 to be directed to the optical head 10. Then, the laser beam L is shaped into a toroidal beam L1 by the beam shaper 11, incident on the solid immersion mirror 12, condensed on the bottom surface of the mirror 12 and oozes out as near-field light. The near-field light is applied to an optical record medium 18.

The optical record medium 18 is a known one having a recording layer and a protective layer formed on the surface thereof. The optical record medium 18 is clamped to the rotation shaft of a spindle motor 19 and rotated about a shaft center C at a predetermined speed. The optical head 10 moves along the radius of the optical record medium 18 at a constant speed to perform recording, reproduction or erasure on the entire surface of the recording layer.

The structure and operation of the beam shaper 11 and the solid immersion mirror 12 will be described below. The beam shaper 11 and the solid immersion mirror 12 may be replaced by beam splitter 13 and a solid immersion lens 14 described below.

Figure 2:
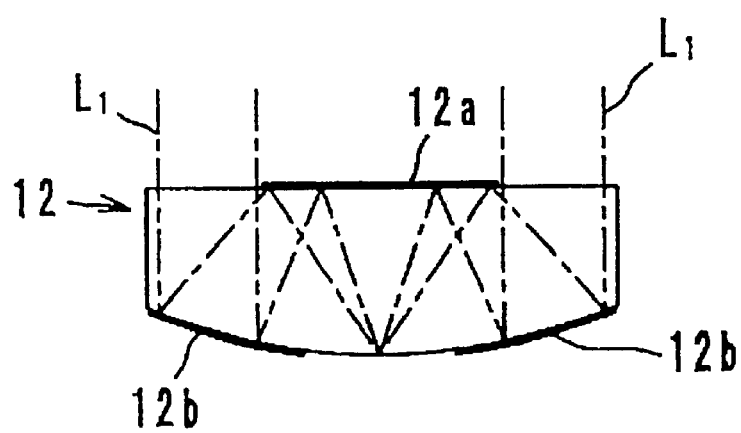
FIG. 2 is an explanatory view showing operation of a solid immersion mirror.

Solid Immersion Mirror, Referring to FIG. 2

FIG. 2 shows the solid immersion mirror 12 for generating near-field light. The solid immersion mirror 12 is made of a high refractive index material, and comprises a first surface (top surface) being plane and a second surface (bottom surface) being spherical or a spherical. A reflecting film 12a is formed in the center of the incident surface, and a reflecting film 12b is formed in the peripheral zonal part of the bottom surface.

On the top surface of the solid immersion mirror 12, the toroidal beam L1 shaped by the beam shaper 11 is incident. The beam L1 is reflected at the reflecting film 12b to be converged, further reflected at the reflecting film 12a to be condensed to a minute spot at the center of the bottom surface, and oozes out as near-field light.

Figure 3:
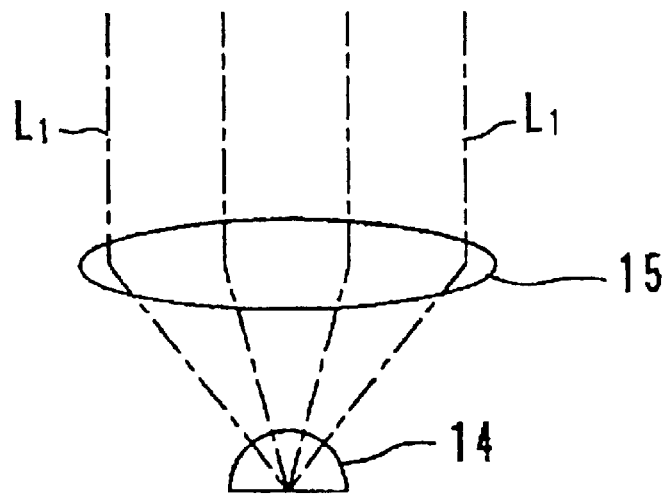
FIG. 3 is an explanatory view showing operation of a solid immersion lens.

Solid Immersion Lens, Referring to FIG. 3

FIG. 3 shows the solid immersion lens 14 for generating near-field light like the solid immersion mirror 12. The solid immersion lens 14 is also made of a high refractive index material, and comprises a first surface (incident surface) being hemispherical (the first surface may be hyperhemisperical) and a second surface (bottom surface, exit surface) being plane. Immediately above the solid immersion lens 14, a condenser lens 15 is disposed.

Various modes are present in which a laser beam is made incident on such immersion lens 14. In this example, when the toroidal beam L1 shaped by the beam shaper 11 is made incident through the condenser lens 15, the beam L1 is refracted to be converged, condensed to a minute spot at the center of the bottom surface, and oozes out as near-field light. The reason why the beam L1 being toroidal is made incident is that a minute light condensation spot can be formed by using light of the high numerical aperture part.

Figure 4:
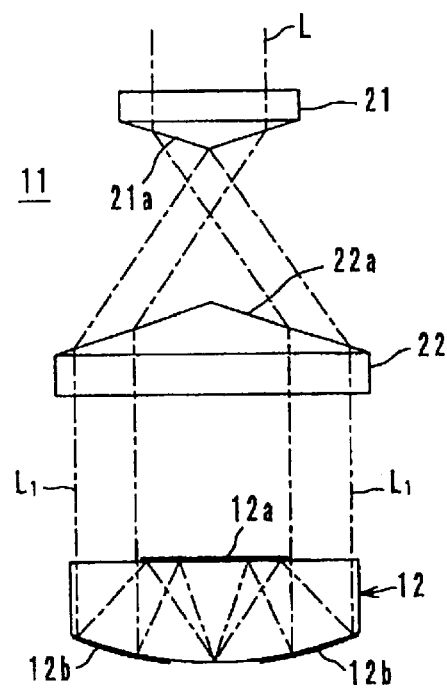
FIG. 4 is an explanatory view showing a first example of beam shaper.

First Example of Beam Shaper, Referring to FIG. 4

This beam shaper 11 comprises a first axicon lens 21 and a second axicon lens 22 coaxially disposed so that convex conical surfaces 21a and 22a thereof are opposed to each other. The parallel laser beam L being incident on the first axicon lens 21 so that the axis thereof coincides with the optical axis of the lens 21 is refracted at the conical surface 21a, intersects at the axis center and is ten shaped into a radially spreading beam being toroidal in cross section. Then, the beam L is incident on the second axicon lens 22 to be refracted at the conical surface 22a, shaped into the parallel tubular beam L1 being toroidal in cross section, and incident on the zonal part of the top surface of the solid immersion minor 12.

Figure 5:
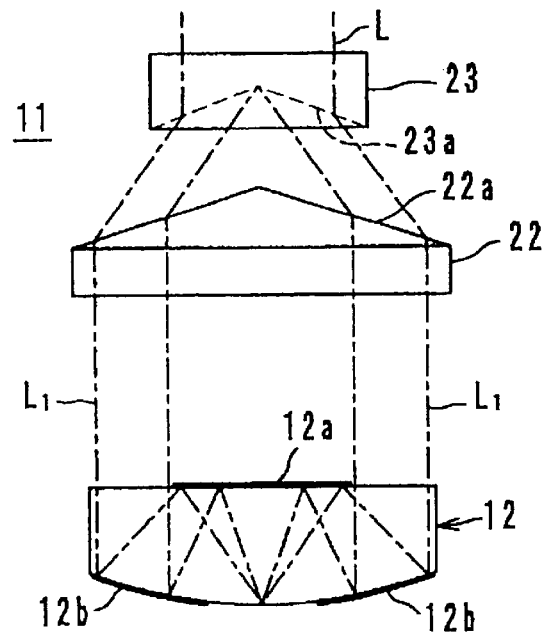
FIG. 5 is an explanatory view showing a second example of the beam shaper.

Second Example of Beam Shaper, Referring to FIG. 5

This beam shaper 11 uses reflection, and comprises a mirror 41 having a conical reflecting surface 41a and a ring-shaped mirror 42 having a conical reflecting surface 42a on the inner surface thereof. The parallel laser beam L being incident on the mirror 41 through the central opening of the ring-shaped mirror 42 is reflected at the reflecting surfaces 41a and 42a, shaped into the parallel tubular beam L1 being toroidal in cross section, and incident on the zonal part of the top surface of the immersion mirror 12.

Figure 6:
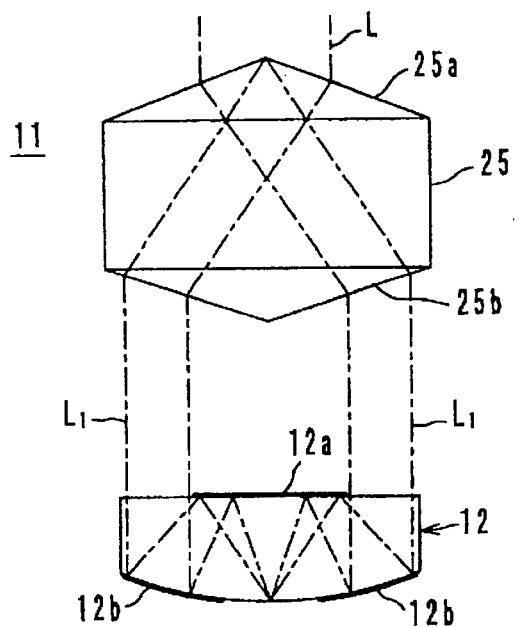
FIG. 6 is an explanatory view showing a third example of the beam shaper.

Third Example of Beam Shaper, Referring to FIG. 6

This beam shaper 11 uses a single lens 25 to shape the laser beam L into the toroidal beam L1. The lens 25 is formed as a double cone prism having convex conical surfaces 25a and 25b at the top and bottom. The parallel laser beam L is refracted at each of the conical surfaces 25a and 25b, shaped into the parallel tubular beam L1 being toroidal in cross section, and incident on the zonal part of the top surface of the solid immersion mirror 12.

Figure 7:
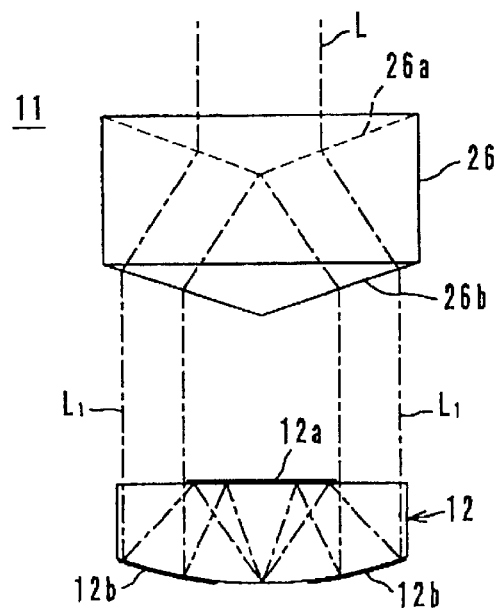
FIG. 7 is an explanatory view showing a fourth example of the beam shaper.

Fourth Example of Beam Shaper, Referring to FIG. 7

This beam shaper 11 uses a single lens 26 to shape the laser beam L into the toroidal beam L1 like the third example. The lens 26 is formed as a double cone prism having a concave conical surface 26a at the top and a convex conical surface 26b at the bottom. The parallel laser beam L is refracted at each of the conical surfaces 26a and 26b, shaped into the parallel tubular beam L1 beingtoroidal in cross section, and incident on the zonal part of the top surface of the solid immersion mirror 12.

Figure 8:
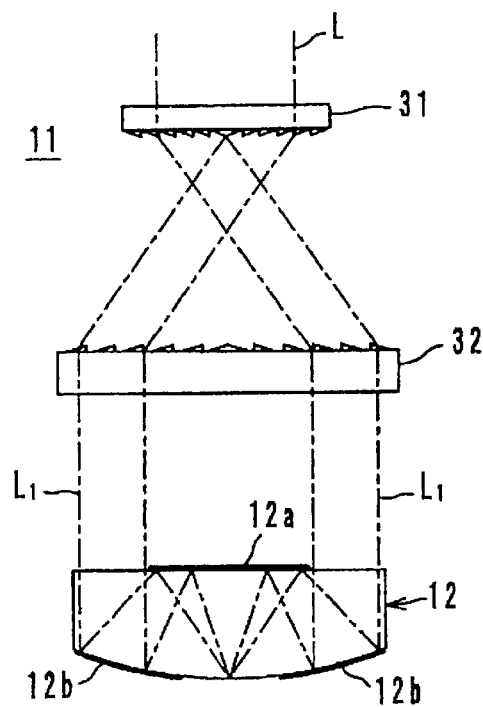
FIG. 8 is an explanatory view showing a fifth example of the beam shaper.

Fifth Example of Beam Shaper, Referring to FIG. 8

This beam shaper 11 also uses reflection, and comprises a single mizror 43 having conical reflecting surfaces 43a and 43b. The parallel laser beam L being incident on the central part of the mirror 43 is reflected at the reflecting surfaces 43a and 43b, shaped into the parallel tubular beam L1 being toroidal in cross section, and incident on the zonal part of the top surface of the solid immersion mirror 12.

In the fifth example, instead of the Fresnel lenses 31 and 32, transmission-type diffraction optical elements using a hologram or the like and having similar functions to the Fresnel lenses 31 and 32 may be used. In the beam shaper 11 of the first to the fourth examples, the axicon lenses may be replaced by diffraction optical elements such as Fresnel lenses.

Figure 9:
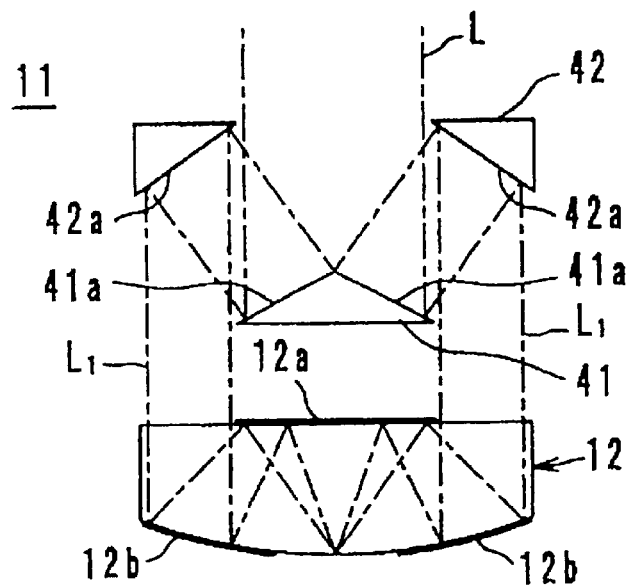
FIG. 9 is an explanatory view showing a sixth example of the beam shaper.

Sixth Example of Beam Shaper, Referring to FIG. 9

This beam shaper 11 uses reflection, and comprises a mirror 41 having a conical reflecting surface 41a and a ring-shaped mirror 42 having a conical reflecting surface 42a on the inner surface thereof. The parallel laser beam L being incident on the mirror 41 through the central opening of the ring-shaped mirror 42 is reflected at the reflecting surfaces 41a and 42a, shaped into the parallel tubular beam L1 beingtoroidal in cross section, and incident on the zonal part of the top surface of the solid immersion mirror 12.

By forming the beam shaper 11 by use of reflection-type elements as described above, generation of chromatic aberration can be prevented.

Figure 10:
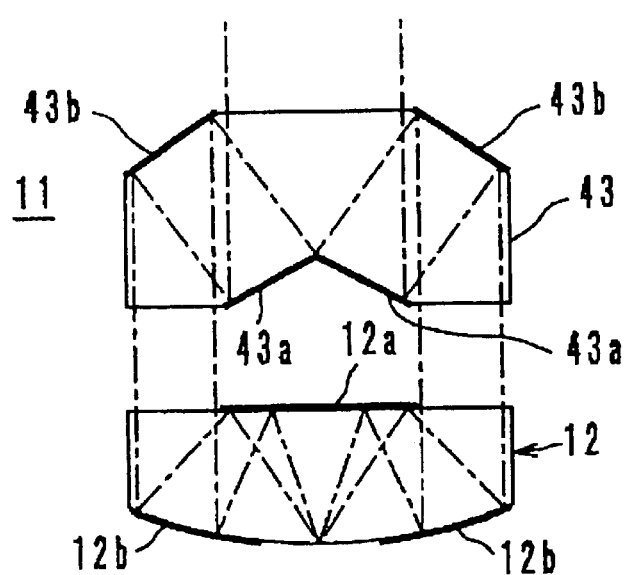
FIG. 10 is an explanatory view showing a seventh example of the beam shaper.

Seventh Example of Beam Shaper, Referring to FIG. 10

This beam shaper 11 also uses reflection, and comprises a single mirror 43 having conical reflecting surfaces 43a and 43b. The parallel laser beam L being incident on the central part of the mirror 43 is reflected at the reflecting surfaces 43a and 43b, shaped into the parallel tubular beam L1 beingtoroidal in cross section, and incident on the zonal part of the top surface of the solid immersion mirror 12.

In the sixth and the seventh examples of the beam shaper 11, the reflecting surfaces of the mirrors 41, 42 and 43 do not necessarily have the illustrated configurations but may be, for example, reflecting surfaces having a configuration of an aggregation of concentric cones like Fresnel lenses. Further, reflection-type diffraction optical elements using a hologram may be used.

Figure 11:
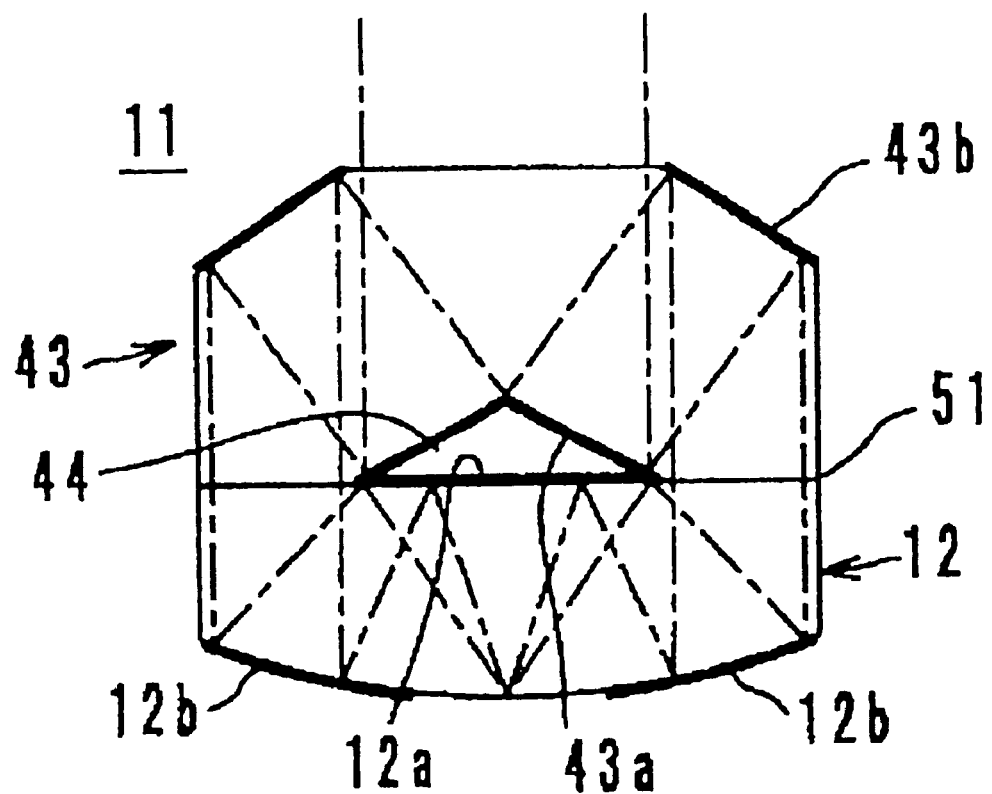
FIG. 11 is an explanatory view showing an eighth example of the beam shaped.

Eighth Example of Beam Shaper, Referring to FIG. 11

This beam shaper 11 is formed integrally with the solid immersion mirror generating near-field light. Specifically, the mirror 43 shown in the seventh example and the solid immersion mirror 12 are cemented together. The conical space formed in the center is left hollow or filled with a different medium. The beam shaper 11 and the solid immersion lens may be integrated to form an optical head.

Figure 12:
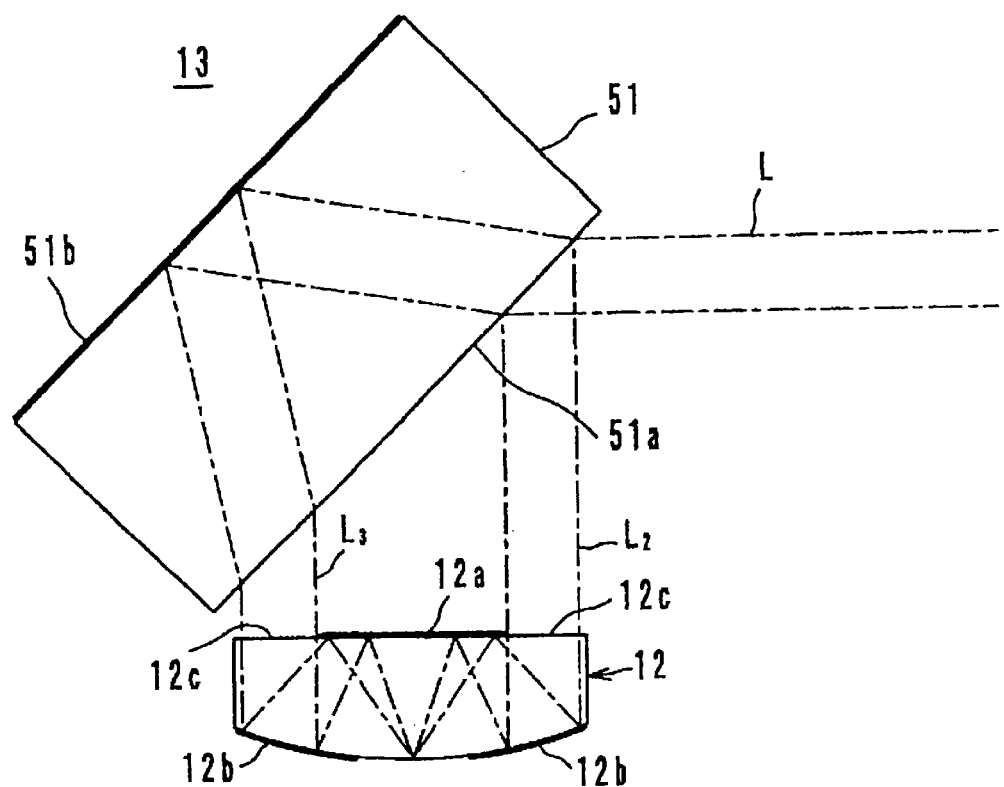
FIG. 12 is an explanatory view showing an example of beam splitter.
Figure 13:
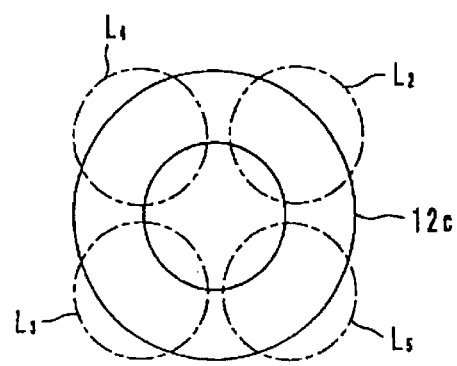
FIG. 13 is an explanatory view showing the condition of light application to the solid immersion mirror by the beam splitter.

Beam Splitter, Referring to FIGS. 12 and 13

Next an example of the beam splitter 13 used instead of the beam shaper 11 will be described The beam splitter 13 comprises, as shown in FIG. 12, one plane parallel mirror 51 having a partially reflecting surface 51a and a totally reflecting surface 51b.

Part of the parallel laser beam L emitted from the light source portion 2 is reflected at the partially reflecting surface 51a to be incident in a spot shape on a zonal part 12c of the solid immersion mirror 12 as a beam L2. Part of the laser beam L transmitted by the partially reflecting surface 51a is reflected at the totally reflecting surface 51b to be incident in a spot shape on the zonal part 12c of the solid immersion mirror 12 as a beam L3.

By using one plane parallel mirror 51 as described above, the laser beam L can be split into the two beams U and L3 so as to be incident on the zonal part 12c of the solid immersion mirror 12. Further, by adding another plane parallel mirror, as shown in FIG. 13, beams L4 and L5 can be made incident on the zonal part 12c. The number of combinations of plane parallel mirrors may be three or more.

As the beam splitter 13, various splitter may be used as well as a plane parallel minor. Moreover the beam splitter 13 and the solid immersion lens 14 may be combined to form an optical head.

Other Embodiments

The optical head and the optical recording and reproducing apparatus according to the present invention are not limited to the above-described embodiment, but various changes and modifications may be made without departing from the spirit and scope of the invention.

While the beam shaper is combined with a solid immersion mirror in the first to the eighth examples of the beam shaper, it may be combined with a solid immersion lens. Moreover, the optical recording and reproducing apparatus may be used as a master plate exposing apparatus manufacturing master plates of optical record media.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical head comprising:
   a near-field light generating element generating near-field light; and
   a beam shaper which shapes an incident beam into a substantially toroidal beam and directs the shaped beam to said near-field light generating element,
   wherein said near-field light generating element is a solid immersion mirror, the solid immersion mirror comprising:
      an incident surface having a first reflecting film on a center portion thereof;
      a bottom surface having, on a peripheral zonal portion thereof, a second reflecting film and an optical power,
      and wherein the shaped beam transmits through the incident surface and is reflected on the first and second reflecting films so as to be focused on a center portion of the bottom surface.

2. An optical head as claimed in claim 1, wherein the beam shaper has a first axicon lens and a second axicon lens coaxially disposed so that convex conical surfaces and thereof are opposed to each other.

3. An optical head as claimed in claim 1, wherein the beam shaper has a first axicon lens and a second axicon lens coaxially disposed so that concave and convex conical surfaces and thereof are opposed to each other.

4. An optical head as claimed in claim 1, wherein the beam shaper is a single lens element formed as a double cone prism having convex conical surfaces and at the top and bottom.

5. An optical head as claimed in claim 1, wherein the beam shaper is a single lens element formed as a double cone prism having a concave conical surface at the top and a convex conical surface at the bottom.

6. An optical head as claimed in claim 1, wherein the beam shaper is two Fresnel lenses and combined in parallel with the lens surfaces thereof opposed to each other.

7. An optical head as claimed in claim 1, wherein the beam shaper is a transmission-type diffraction optical element.

8. An optical head as claimed in claim 1, wherein the beam shaper has a mirror having a conical reflecting surface and a ring-shaped mirror having a conical reflecting surface on the inner surface thereof.

9. An optical head as claimed in claim 1, wherein the beam shaper is a single mirror elements having conical reflecting surfaces.

10. An optical head as claimed in claim 1, wherein the beam sharer formed integrally with the solid immersion mirror generating near-field light.

11. An optical apparatus comprising:
    a light source which emits a beam; and
    an optical head, having
    a near-field generating element generating near-field light emitted from the light source; and
    a beam shaper which shapes an incident beam into a substantially toroidal beam and directs the shaped beam to said near-field light generating element,
    wherein said near-field light generating element is a solid immersion mirror, the solid immersion mirror comprising:
       an incident surface having a first reflecting film on a center portion thereof;
       a bottom surface having, on a peripheral zonal portion thereof, a second reflecting film and an optical power,
       and wherein the shaped beam transmits through the incident surface and is reflected on the first and second reflecting films so as to be focused on a center portion of the bottom surface.

12. An optical head comprising:
    a near-field light generating element which generates near-field light; and
    a beam splitter which splits an incident light into a plurality of beams and directs the split beams to a zonal part of said near-field light generating element, wherein
    the beam splitter has one plane parallel mirror having a partially reflecting surface and a totally reflecting surface, the totally reflecting surface is opposed to the partially reflecting surface, and wherein a first light out of the incident light is reflected on the partially reflecting surface; a second light that transmits through the partially reflecting surface is reflected on the totally reflecting surface and then transmits through the partially reflecting surface, so that the first light and the second light are directed to the zonal part of the solid immersion mirror, respectively.

* * * * *